(12) United States Patent  (10) Patent No.: US 8,006,998 B2
Hatfield et al.  (45) Date of Patent: Aug. 30, 2011

(54) INFLATABLE AIRBAG ASSEMBLIES WITH MODULAR COMPONENTS AND RELATED METHODS OF MANUFACTURE

(75) Inventors: Mark S. Hatfield, Providence, UT (US); Kevin Button, Plain City, UT (US); James Coleman, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/507,699

(22) Filed: Jul. 22, 2009

(65) Prior Publication Data

US 2011/0018245 A1  Jan. 27, 2011

(51) Int. Cl.
*B60R 21/16* (2006.01)

(52) U.S. Cl. .................................................. 280/730.2

(58) Field of Classification Search ............... 280/730.2, 280/743.2
See application file for complete search history.

(56) References Cited

U.S. PATENT DOCUMENTS

| | | | |
|---|---|---|---|
| 5,746,690 A | 5/1998 | Humbarger et al. | |
| 5,899,486 A * | 5/1999 | Ibe .............................. | 280/728.2 |
| 5,944,342 A | 8/1999 | White et al. | |
| 6,073,961 A | 6/2000 | Bailey et al. | |
| 6,099,026 A | 8/2000 | Ando et al. | |
| 6,209,907 B1 | 4/2001 | Fischer | |
| 6,223,389 B1 | 5/2001 | Walsh et al. | |
| 6,305,707 B1 | 10/2001 | Ishiyama et al. | |
| 6,412,810 B1 | 7/2002 | Wipasuramonton et al. | |
| 6,415,560 B1 | 7/2002 | Rinderer | |
| 6,550,809 B1 | 4/2003 | Masuda et al. | |
| 6,626,456 B2 | 9/2003 | Terbu et al. | |
| 6,672,612 B2 | 1/2004 | Sauer et al. | |
| 6,705,635 B2 | 3/2004 | Hoeft et al. | |
| 6,743,162 B2 | 6/2004 | Hieber et al. | |
| 6,749,220 B1 | 6/2004 | Wipasuramonton et al. | |
| 6,758,490 B2 | 7/2004 | Hoeft et al. | |
| 6,796,576 B2 | 9/2004 | Aoki et al. | |
| 6,851,702 B2 | 2/2005 | Henderson et al. | |
| 6,889,999 B2 | 5/2005 | Dominissini et al. | |
| 6,902,187 B2 | 6/2005 | Sonnenberg | |
| 6,991,256 B2 | 1/2006 | Henderson et al. | |
| 7,083,188 B2 | 8/2006 | Henderson et al. | |
| 7,097,200 B2 | 8/2006 | Wold | |
| 7,121,579 B2 | 10/2006 | Ochiai et al. | |

(Continued)

FOREIGN PATENT DOCUMENTS

DE 10 2005 012 845 9/2006

(Continued)

OTHER PUBLICATIONS

Office Action mailed Oct. 1, 2010 in co-pending U.S. Appl. No. 12/495,243, now published as U.S. Appl. No. US 2010/0327564.

(Continued)

*Primary Examiner* — Faye M. Fleming
(74) *Attorney, Agent, or Firm* — Sally J. Brown; Stoel Rives LLP (57) ABSTRACT

Inflatable airbag cushions often have modular components attached to them after the main airbag has been manufactured. Such modular components can include external tethers, mounting tabs, mounting assemblies, inflatable curtain ramps, and fill tubes. Often, these modular components are positioned at predetermined locations on the airbag. The modular component can be coupled to the airbag by employing one or more adhesives. Also, the modular component can be coupled to the airbag by stitching.

14 Claims, 9 Drawing Sheets

U.S. PATENT DOCUMENTS

| | | | |
|---|---|---|---|
| 7,125,037 | B2 | 10/2006 | Tallerico et al. |
| 7,159,896 | B2 | 1/2007 | Ochiai et al. |
| 7,163,231 | B2 | 1/2007 | Kumagai |
| 7,172,212 | B2 | 2/2007 | Aoki et al. |
| 7,261,682 | B2 | 8/2007 | Cookston et al. |
| 7,328,911 | B2 | 2/2008 | Chapman |
| 7,344,154 | B2 | 3/2008 | Yokoyama et al. |
| 7,357,408 | B2 | 4/2008 | Hall et al. |
| 7,407,182 | B2 | 8/2008 | Aoki et al. |
| 7,478,826 | B2 | 1/2009 | Soderquist et al. |
| 7,547,038 | B2 * | 6/2009 | Coleman ............... 280/728.2 |
| 7,568,730 | B2 | 8/2009 | Kwon |
| 7,641,220 | B2 | 1/2010 | Visker et al. |
| 7,731,224 | B2 * | 6/2010 | Enriquez et al. ........ 280/730.2 |
| 7,823,914 | B2 | 11/2010 | Cheal et al. |
| 2002/0158450 | A1 | 10/2002 | Hoeft et al. |
| 2002/0195803 | A1 | 12/2002 | Terbu et al. |
| 2003/0006589 | A1 | 1/2003 | Aoki et al. |
| 2003/0042712 | A1 | 3/2003 | Henderson et al. |
| 2003/0184057 | A1 | 10/2003 | Kumagai |
| 2004/0000775 | A1 | 1/2004 | Henderson et al. |
| 2005/0010335 | A1 | 1/2005 | Kettenacker et al. |
| 2005/0029778 | A1 | 2/2005 | Weber et al. |
| 2005/0046154 | A1 | 3/2005 | Rhea et al. |
| 2005/0104335 | A1 | 5/2005 | Henderson et al. |
| 2005/0110256 | A1 | 5/2005 | Cookston et al. |
| 2005/0121887 | A1 * | 6/2005 | Inoue et al. ............ 280/730.2 |
| 2005/0179238 | A1 | 8/2005 | Kippschull et al. |
| 2005/0206138 | A1 | 9/2005 | Breuninger et al. |
| 2005/0236815 | A1 * | 10/2005 | Kismir et al. ............ 280/728.1 |
| 2006/0043703 | A1 | 3/2006 | Enriquez |
| 2006/0119084 | A1 | 6/2006 | Coon et al. |
| 2006/0138762 | A1 | 6/2006 | Jang |
| 2006/0192368 | A1 | 8/2006 | Hall et al. |
| 2006/0197316 | A1 | 9/2006 | Watanabe |
| 2006/0237957 | A1 | 10/2006 | Woydick |
| 2007/0003390 | A1 | 1/2007 | Kawai |
| 2007/0019891 | A1 | 1/2007 | Daniel |
| 2007/0024031 | A1 * | 2/2007 | Coleman ............... 280/728.2 |
| 2007/0090630 | A1 | 4/2007 | Wilmot |
| 2007/0090634 | A1 | 4/2007 | Jang et al. |
| 2007/0126211 | A1 | 6/2007 | Moerke et al. |
| 2007/0216139 | A1 | 9/2007 | Mazanek et al. |
| 2007/0296189 | A1 | 12/2007 | Berntsson et al. |
| 2008/0061535 | A1 | 3/2008 | Everard et al. |
| 2008/0197610 | A1 | 8/2008 | Downey |
| 2008/0217892 | A1 | 9/2008 | Maripudi et al. |
| 2008/0217896 | A1 | 9/2008 | Visker et al. |
| 2008/0224457 | A1 | 9/2008 | Brough et al. |
| 2008/0284142 | A1 | 11/2008 | Cheal et al. |
| 2010/0327564 | A1 | 12/2010 | Cheal |
| 2011/0018245 | A1 | 1/2011 | Hatfield et al. |
| 2011/0042923 | A1 | 2/2011 | Hatfield et al. |
| 2011/0057422 | A1 | 3/2011 | Cheal et al. |

FOREIGN PATENT DOCUMENTS

| | | |
|---|---|---|
| GB | 2309942 | 8/1997 |
| WO | WO-2004/087471 | 10/2004 |
| WO | WO 2006/097309 | 9/2006 |
| WO | WO 2007/018650 | 2/2007 |
| WO | WO 2008/109396 | 9/2008 |
| WO | WO 2008/144121 | 11/2008 |
| WO | WO-2011/022614 | 2/2011 |
| WO | WO-2011/031584 | 3/2011 |

OTHER PUBLICATIONS

Notification of Transmittal of the International Search Report and the Written Opinion of the International Searching Authority issued Oct. 26, 2010 in International Application No. PCT/US2010/047258.

Notification of Transmittal of the International Search Report and the Written Opinion of the International Searching Authority issued Oct. 20, 2010 in International Application No. PCT/US2010/046113.

Amendment and Response to Office Action filed Mar. 31, 2011 in co-pending U.S. Appl. No. 12/495,243, now published as U.S. Appl. No. US 2010/0327564.

Office Action mailed Nov. 4, 2010 in co-pending U.S. Appl. No. 12/544,952, now published as U.S. Appl. No. US 2011/0042923.

Notification of Transmittal of the International Search Report and the Written Opinion of the International Searching Authority issued Mar. 14, 2011 in International Application No. PCT/US2011/021662.

Office Action issued Apr. 16, 2007 in U.S. Appl. No. 11/068,662, now U.S. Patent No. 7,357,408.

Amendment and Response to Office Action filed Oct. 16, 2007 in U.S. Appl. No. 11/068,662, now U.S. Patent No. 7,357,408.

Notice of Allowance and Fee(s) Due issued Dec. 4, 2007 in U.S. Appl. No. 11/068,662, now U.S. Patent No. 7,357,408.

Office Action issued Mar. 26, 2008 in U.S. Appl. No. 11/192,258, now U.S. Patent No. 7,547,038.

Response to Requirement for Election filed May 23, 2008 in U.S. Appl. No. 11/192,258, now U.S. Patent No. 7,547,038.

Office Action issued Aug. 8, 2008 in U.S. Appl. No. 11/192,258, now U.S. Patent No. 7,547,038.

Amendment and Response to Office Action filed Nov. 25, 2008 in U.S. Appl. No. 11/192,258, now U.S. Patent No. 7,547,038.

Notice of Non-Compliant Amendment issued Dec. 8, 2008 in U.S. Appl. No. 11/192,258, now U.S. Patent No. 7,547,038.

Interview Summary issued Dec. 9, 2008 in U.S. Appl. No. 11/192,258, now U.S. Patent No. 7,547,038.

Response to Notice of Non-Compliant Amendment filed Dec. 10, 2008 in U.S. Appl. No. 11/192,258, now U.S. Patent No. 7,547,038.

Notice of Allowance and Fee(s) Due issued Dec. 24, 2008 in U.S. Appl. No. 11/192,258, now U.S. Patent No. 7,547,038.

Summary of Interview filed Jan. 5, 2009 in U.S. Appl. No. 11/192,258, now U.S. Patent No. 7,547,038.

Request for Continued Examination filed Jan. 21, 2009 in U.S. Appl. No. 11/192,258, now U.S. Patent No. 7,547,038.

Notice of Allowance and Fee(s) Due issued Feb. 27, 2009 in U.S. Appl. No. 11/192,258, now U.S. Patent No. 7,547,038.

Office Action issued Feb. 24, 2009 in U.S. Appl. No. 11/714,037, now U.S. Patent No. 7,641,220.

Amendment and Response to Office Action issued Aug. 24, 2009 in U.S. Appl. No. 11/714,037, now U.S. Patent No. 7,641,220.

Notice of Allowance and Fee(s) Due issued Sep. 16, 2009 in U.S. Appl. No. 11/714,037, now U.S. Patent No. 7,641,220.

Office Action issued May 4, 2009 in co-pending U.S. Appl. No. 11/803,238, now U.S. Publication No. US-2008/0284142.

Amendment and Response to Office Action filed Nov. 4, 2009 in co-pending U.S. Appl. No. 11/803,238, now U.S. Publication No. US-2008/0284142.

Office Action issued Mar. 10, 2010 in co-pending U.S. Appl. No. 11/803,238, now U.S. Publication No. US-2008/0284142.

Amendment and Response to Office Action filed Jun. 4, 2010 in co-pending U.S. Appl. No. 11/803,238, now U.S. Publication No. US-2008/0284142.

Notice of Allowance and Fee(s) Due issued Jul. 9, 2010 in co-pending U.S. Appl. No. 11/803,238, now U.S. Publication No. US-2008/0284142.

Request for Continued Examination filed Aug. 9, 2010 in co-pending U.S. Appl. No. 11/803,238, now U.S. Publication No. US 2008/0284142.

Notice of Allowance issued Sep. 14, 2010 in co-pending U.S. Appl. No. 11/803,238, now U.S. Publication No. US 2008/0284142.

Restriction Requirement issued Aug. 11, 2010 in co-pending U.S. Appl. No. 12/544,952.

Amendment and Response to Requirement for Election of Species filed Oct. 11, 2010 in co-pending U.S. Appl. No. 12/544,952.

Notification of Transmittal of the International Search Report and the Written Opinion of the International Searching Authority issued May 2, 2006 in International Application No. PCT/US2006/017127.

Notification of Transmittal of the International Search Report and the Written Opinion of the International Searching Authority issued Sep. 29, 2008 in International Application No. PCT/US2008/055420.

Notification of Transmittal of the International Search Report and the Written Opinion of the International Searching Authority issued Sep. 4, 2008 in International Application No. PCT/US2008/059648.

Co-pending U.S. Appl. No. 12/555,486, titled Mounting Assemblies With Wrappers for Inflatable Curtain Airbags, filed Sep. 8, 2009.

Co-pending U.S. Appl. No. 12/495,243, titled Airbag Mounting Assemblies With Double-Locking Wrappers, filed Jun. 30, 2009.

Co-pending U.S. Appl. No. 12/689,813, titled Double-Sewn Airbag Mounting Assemblies, filed Jan. 19, 2010.

Co-pending U.S. Appl. No. 12/544,952, titled Inflatable Airbag Assemblies With Alignment Apertures, filed Aug. 20, 2009.

* cited by examiner

FIG. 4C

INFLATABLE AIRBAG ASSEMBLIES WITH MODULAR COMPONENTS AND RELATED METHODS OF MANUFACTURE

TECHNICAL FIELD

The present disclosure relates generally to the field of automotive protective systems. More specifically, the present disclosure relates to modular components of inflatable curtain airbags, and methods of manufacturing inflatable airbag assemblies with modular components.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over event. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of side windows and a B-pillar of the vehicle. In some embodiments, inflatable curtain airbags may extend from an A-pillar to a C-pillar of the vehicle. In alternative embodiments, inflatable curtain airbags may extend from the A-pillar to a D-pillar of the vehicle.

Inflatable curtain airbags are typically installed adjacent to the roof rail of a vehicle in an undeployed state, in which the inflatable curtain airbag is rolled or folded or a combination thereof and retained in the folded or rolled configuration by being wrapped at certain points along the airbag. In this state, the airbag may be said to be in a packaged configuration. When deployed, the airbag exits the packaged configuration and assumes an extended shape. When extended and inflated, the airbag may be said to comprise a deployed configuration. Thus, an airbag mounting apparatus typically allows for a secure connection between the vehicle and the airbag, yet allows the airbag to change configurations from the packaged configuration to the deployed configuration.

Figure 1A:
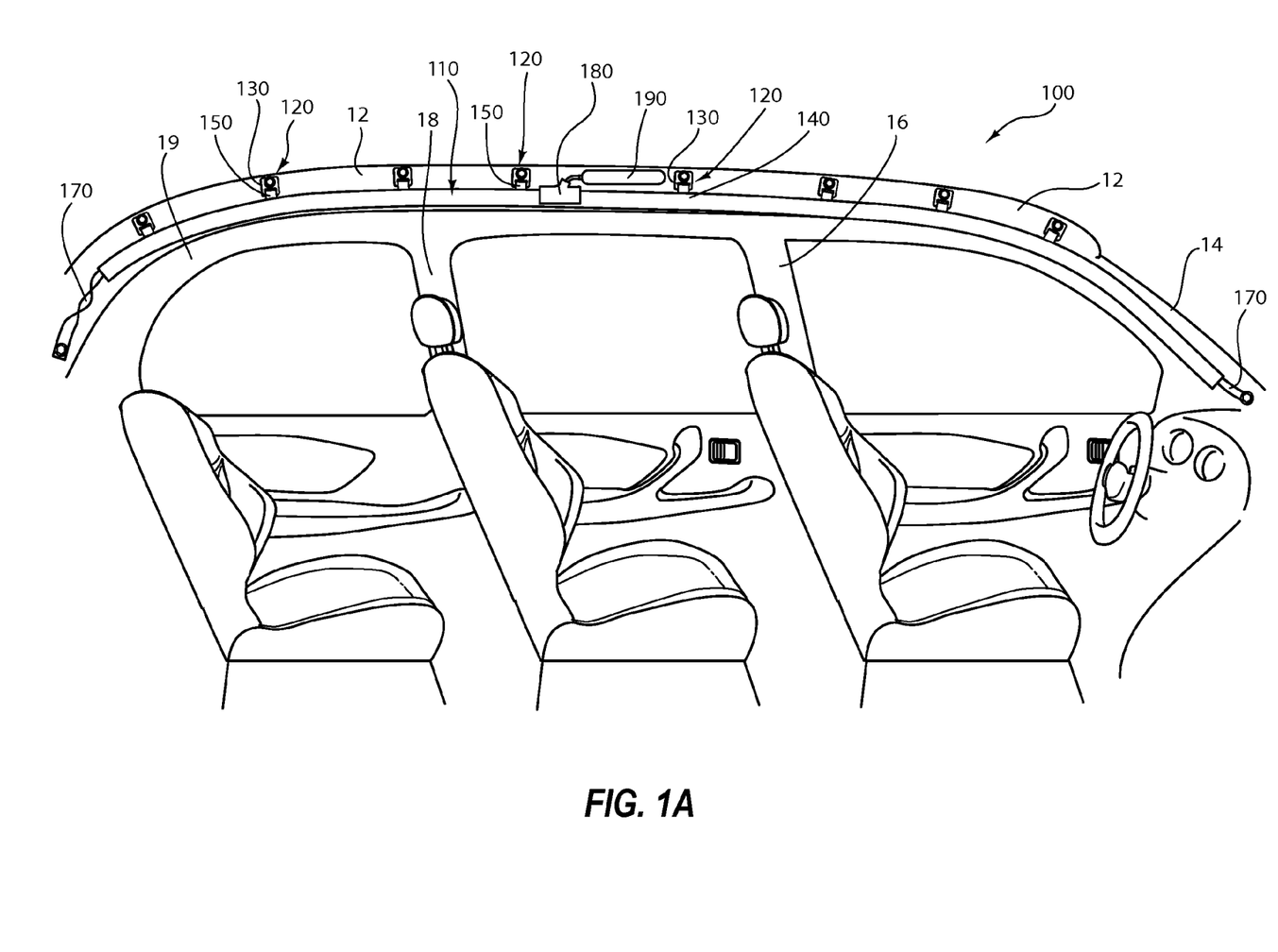
FIG. 1A is a perspective view of one embodiment of an airbag assembly, wherein the airbag assembly comprises a mounting assembly that is coupled to an inflatable curtain airbag, wherein the mounting assembly is configured to retain the airbag in a packaged configuration.

FIG. 1A depicts airbag assembly 100 from a perspective view, wherein an inflatable curtain airbag 110 that is in a packaged configuration, and is mounted adjacent a vehicle roof rail 12. Airbag assembly 100 may comprise inflatable curtain airbag 110, an airbag mounting assembly 120, tethers 170, a fill tube 180, and an inflator 190. Airbag assembly 100 may be considered to comprise one or more modular components.

A modular component may be defined as a component that is coupled to an inflatable airbag, but is not contiguous with the fabric from which the airbag is formed. A modular component may also be considered to be a sub-assembly of an airbag assembly, wherein the component is coupled to the inflatable airbag after the airbag has been manufactured; however, some components may be coupled to the airbag during airbag manufacture. A modular component may be manufactured before or after the inflatable airbag is manufactured. A modular component need not be suitable for use with more than one type of inflatable airbag or species of airbag. For example, a modular component may have a predetermined length that is intended for use in a specific vehicle make and model and with a predetermined airbag design, such that the component may not be suitable for use in a different vehicle make and model or with a different inflatable curtain airbag. The modular component may be located at or coupled to a periphery of the airbag, such that the component may be called a "peripheral component" or a "peripheral modular component". Further, the modular component may be called a "feature," "attachable feature," or "separate feature". Mounting assembly 120, tethers 170, and fill tube 180 can be considered modular components of inflatable curtain airbag assembly 100.

A modular component may be located at a predetermined position on an inflatable airbag, wherein the predetermined position is defined by a location along one or more axes. For example, a modular component may have a predetermined position along an axis that runs from a top portion or a bottom portion of an airbag (Y-axis), but its position along an axis that runs laterally from a first side to a second (X-axis) side can vary. Alternatively, a predetermined location for a modular component may be defined by a position on both X- and Y-axes. Further a predetermined location for a modular component may be defined by a position on X-, Y-, and Z-axes.

A plurality of mounting assemblies 120 may be employed to couple inflatable curtain airbag 110 to a vehicle. Mounting assembly 120 may comprise a mounting member 130, a wrapping member 140, and a connecting member (not visible). The mounting member, the wrapping member, and the connecting member are examples of members of a modular component. Mounting assembly 120 may be employed to couple airbag 110 adjacent to a vehicle roof rail 12 or other vehicle structure. As such, mounting assembly may be said to be a portion of an airbag assembly, which may comprise an inflatable curtain airbag and a mounting assembly. In the depicted embodiment, airbag 110 is an inflatable curtain airbag cushion, which extends from an A-pillar 14 to a D-pillar 19. Inflatable curtain airbag 110 also extends past a B-pillar 16 and a C-pillar 18 such that in a deployed configuration, the curtain airbag at least partially covers the B- and C-pillars, as depicted in FIG. 1B.

Figure 1B:
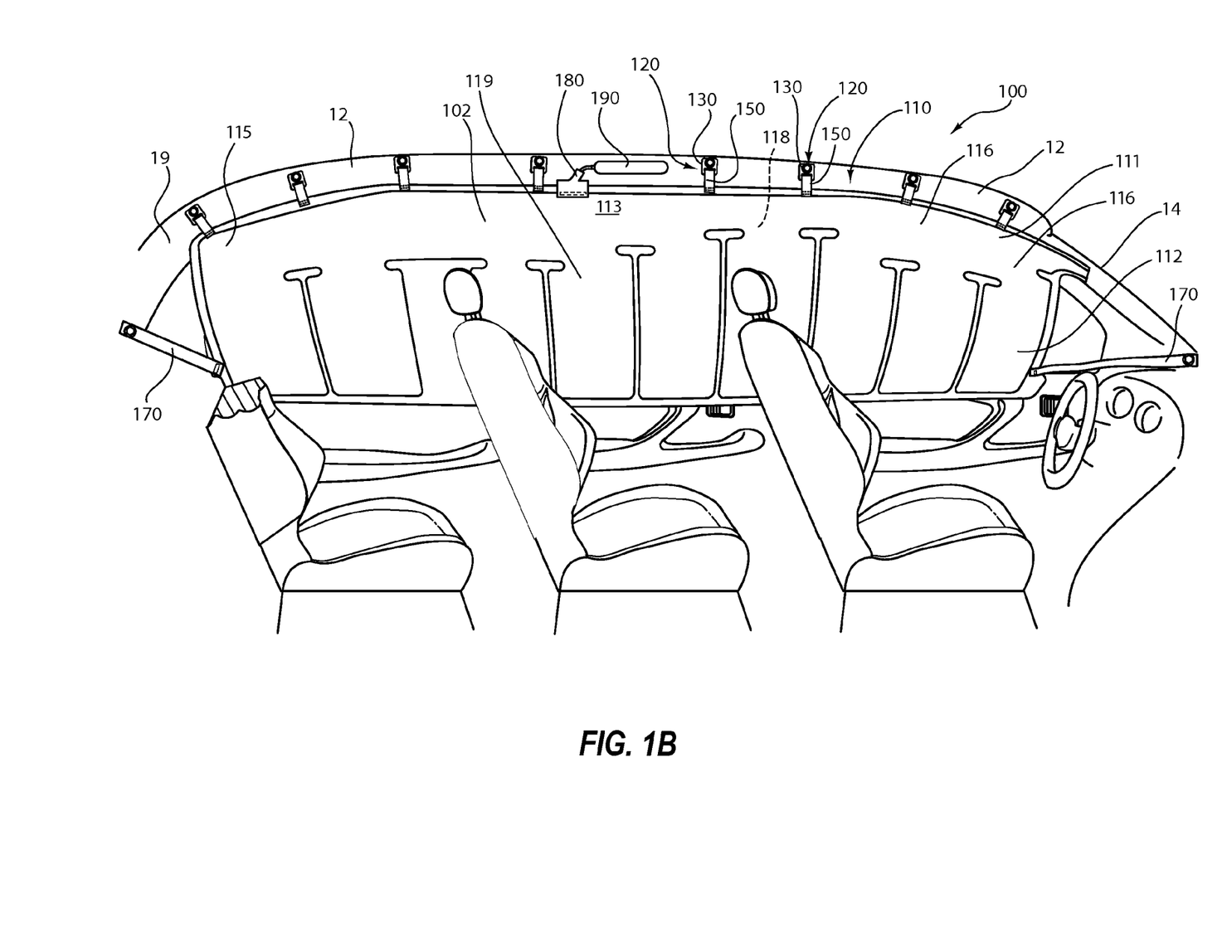
FIG. 1B is a perspective view of the airbag assembly of FIG. 1A, wherein the inflatable curtain airbag is in a deployed configuration.

FIG. 1B is a perspective view of mounting assembly 120, wherein inflatable curtain airbag 110 is depicted in a deployed configuration. Inflatable curtain airbag 110 is configured to become inflated upon activation of one or more inflators such that the inflatable curtain airbag transitions from the packaged configuration to the deployed configuration. During deployment, wrapping member 140 is configured to rupture such that inflatable curtain airbag 110 can adopt the deployed configuration. Inflatable curtain airbag 110 may be described as having an upper portion 111, a lower portion 112, a first face 113, a second face (not visible) a first side 115, and a second side 116. The various faces of inflatable curtain airbag 110 define an interior inflatable void 118, which is in fluid communication with inflator 190. Inflatable void 118 may be divided into inflation cells 119. The various faces of inflatable curtain airbag 110 may comprise panels of a woven nylon fabric that are coupled together at a seam.

Upper portion 111 of inflatable curtain airbag 110 is the portion of the curtain airbag that is closest to the headliner of a vehicle when the airbag is in a deployed state. Lower portion 112 is below upper portion 111 when inflatable curtain airbag 110 is in a deployed state, and is closest to a floor of the vehicle. The term "lower portion" is not necessarily limited to the portion of inflatable curtain airbag 110 that is below a horizontal medial plane of the inflatable curtain airbag, but may include less than half, more than half or exactly half of the bottom portion of the inflatable curtain airbag. Likewise, the term "upper portion" is not necessarily limited to the portion of inflatable curtain airbag 110 that is above a horizontal medial plane of the inflatable curtain airbag, but may include less than half, more than half or exactly half of the top portion of the inflatable curtain airbag.

Upon activation, inflator 190 rapidly generates and/or releases inflation gas, which rapidly inflates the inflatable curtain airbag. The inflator may be one of several types, such as pyrotechnic, stored gas, or a combination inflator and may comprise a single or multistage inflator. As cushion 110 becomes inflated, tension is applied to wrapping member 140, which causes the wrapping member to cease to retain the inflatable curtain airbag in the packaged configuration. Tethers 170 are located outside inflatable curtain airbag 110, and in the deployed configuration, the tethers are configured to apply tension to the curtain airbag.

As will be appreciated by those skilled in the art, a variety of types and configurations of inflatable curtain airbag membranes can be utilized without departing from the scope and spirit of the present disclosure. For example, the size, shape, and proportions of the airbag membrane may vary according to its use in different vehicles or different locations within a vehicle such that the airbag may comprise an inflatable curtain cushion; a rear passenger side airbag; a driver's airbag; and/or a front passenger airbag. Also, the airbag may comprise one or more of any material well known in the art, such as a woven nylon fabric, which may be coated with a substance, such as silicone. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Figure 2A:
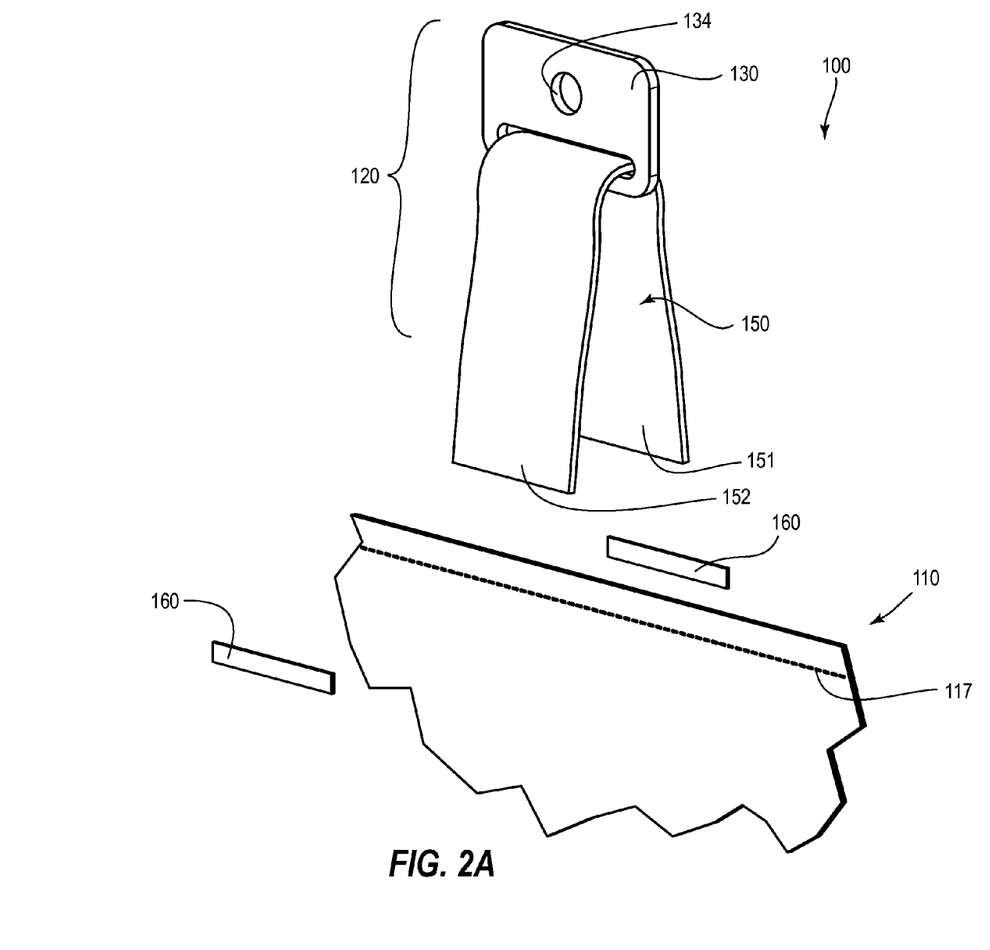
FIG. 2A is a perspective view of a portion of the airbag assembly of FIG. 1A, wherein the inflatable curtain airbag is partially cutaway and a mounting assembly is not yet coupled to the inflatable curtain airbag.
Figure 2B:
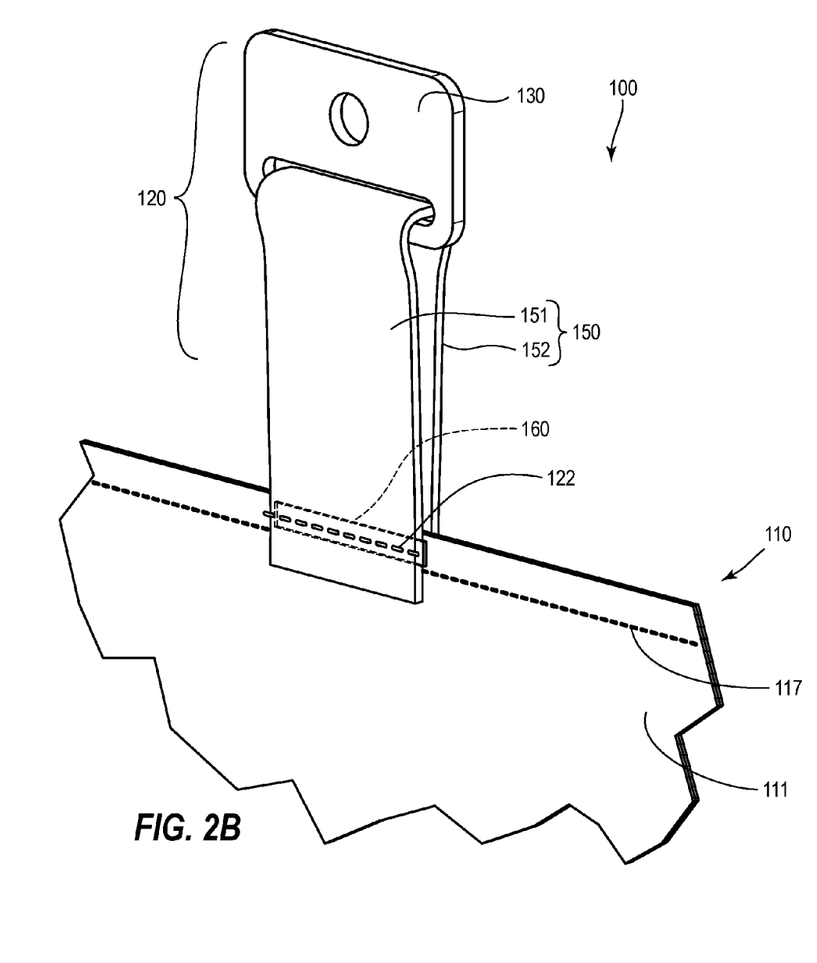
FIG. 2B is a perspective view of the portion of the airbag assembly of FIG. 2A after the mounting assembly has been coupled to the inflatable curtain airbag.

FIGS. 2A-2B are perspective views of a portion of airbag assembly 100 of FIG. 1A, wherein the inflatable curtain airbag is partially cutaway, and mounting assembly 120 is depicted adjacent to upper portion 111 of cushion 110. In the depiction of FIG. 2A, mounting assembly 120 has not yet been coupled to inflatable curtain airbag 110. Mounting assembly 120 may comprise a mounting member 130 and a connecting member 150. Adhesive 160 may be employed to couple mounting assembly 120 to inflatable curtain airbag 110. Adhesive 160 may comprise single-sided tape, double-sided tape, glue, sealant, any other suitable adhesive, or a combination of the preceding. In one embodiment, the adhesive comprises Wacker 4070/60, which can adhere to silicone coated nylon material and uncoated nylon material.

In the depiction of FIG. 2A, two pieces of adhesive 160 are used; however one skilled in the art will recognize that more or fewer pieces of adhesive may be used and that the depiction of FIG. 2A is not intended to imply discrete units of adhesive. For example, if a liquid adhesive is employed, then the adhesive will not look like the depiction of FIG. 2A.

Mounting member 130 may comprise a planar metal member or in other embodiments, a fabric, such as a woven nylon material. Mounting member 130 may have a receiving aperture 134 that can be configured as an elongated slot. If the mounting member comprises a fabric, the mounting member may not have a receiving aperture. Receiving aperture 134 is configured to receive connecting member 150. Connecting member 150 may comprise a first portion 151 and a second portion 152. Connecting member 150 may comprise a rectangular piece of a non-frangible material, and is configured to interconnect mounting member 130 with an inflatable curtain airbag. Connecting member 150 may be folded across its long axis to form a loop, which can surround a bottom portion of mounting member 130.

In the depiction of FIG. 2B, stitching 122 has been employed to couple mounting assembly 120 to upper portion 111 of inflatable curtain airbag 110. Stitching 122 is configured to fixedly couple mounting member 130 to inflatable curtain cushion 110 via connecting member 150. As such, stitching 122 protrudes through connecting member 150. Stitching 122 may protrude through adhesive 160. Stitching 122 may be distinct from stitching 117. First and second portions 151 and 152 are depicted as being coupled to opposite sides of inflatable curtain airbag 110; however, in another embodiment, the first and second portions are coupled to the same side of inflatable curtain airbag 110.

One skilled in the art will recognize that a variety of configurations of mounting assemblies may be used without departing from the spirit of the present disclosure. For example, the mounting assembly may have a wrapping member coupled to the connecting member and/or mounting member, wherein the wrapping member is configured to retain the inflatable curtain cushion in a packaged configuration.

Figure 3A:
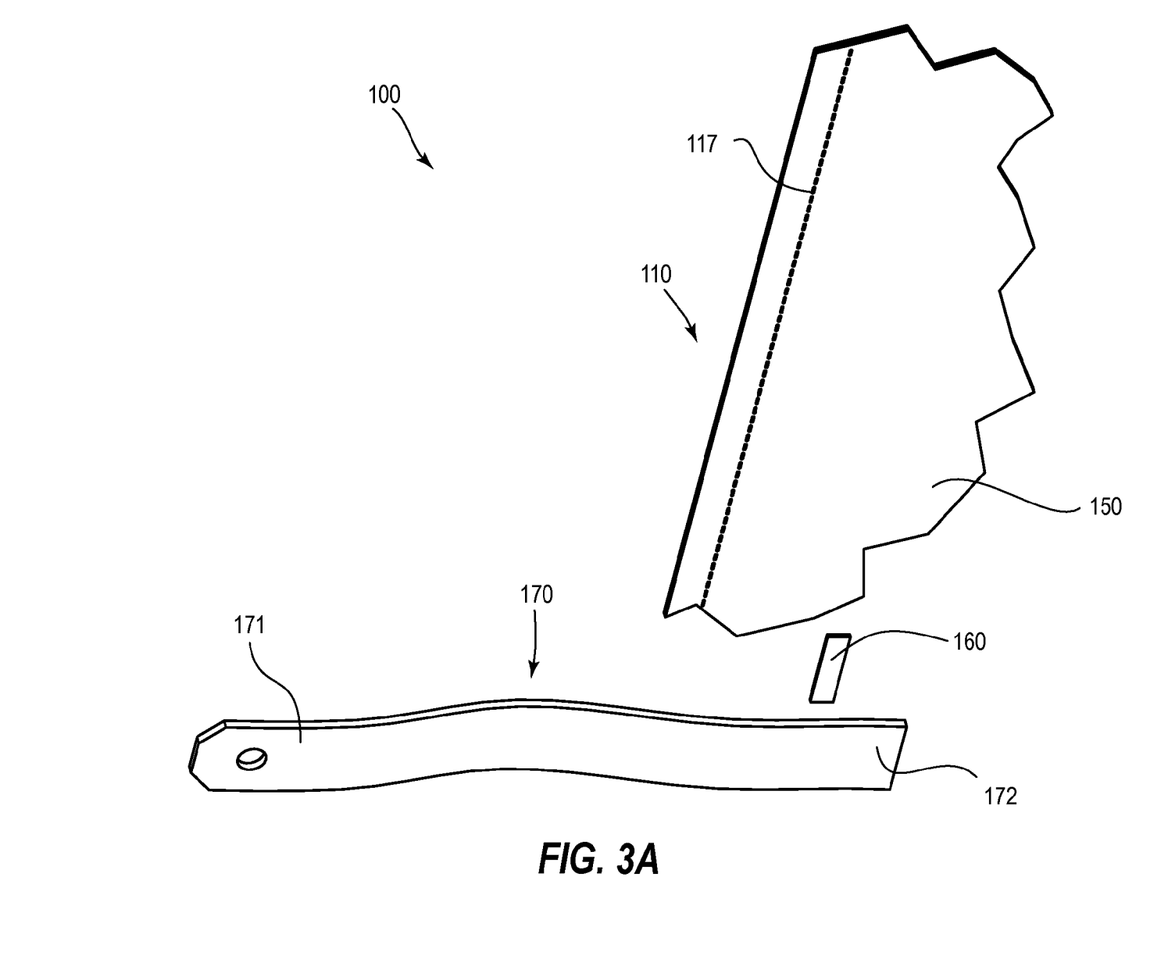
FIG. 3A is a perspective view of a portion of the airbag assembly of FIG. 1A, wherein the inflatable curtain airbag is partially cutaway and an external tether is not yet coupled to the inflatable curtain airbag.
Figure 3B:
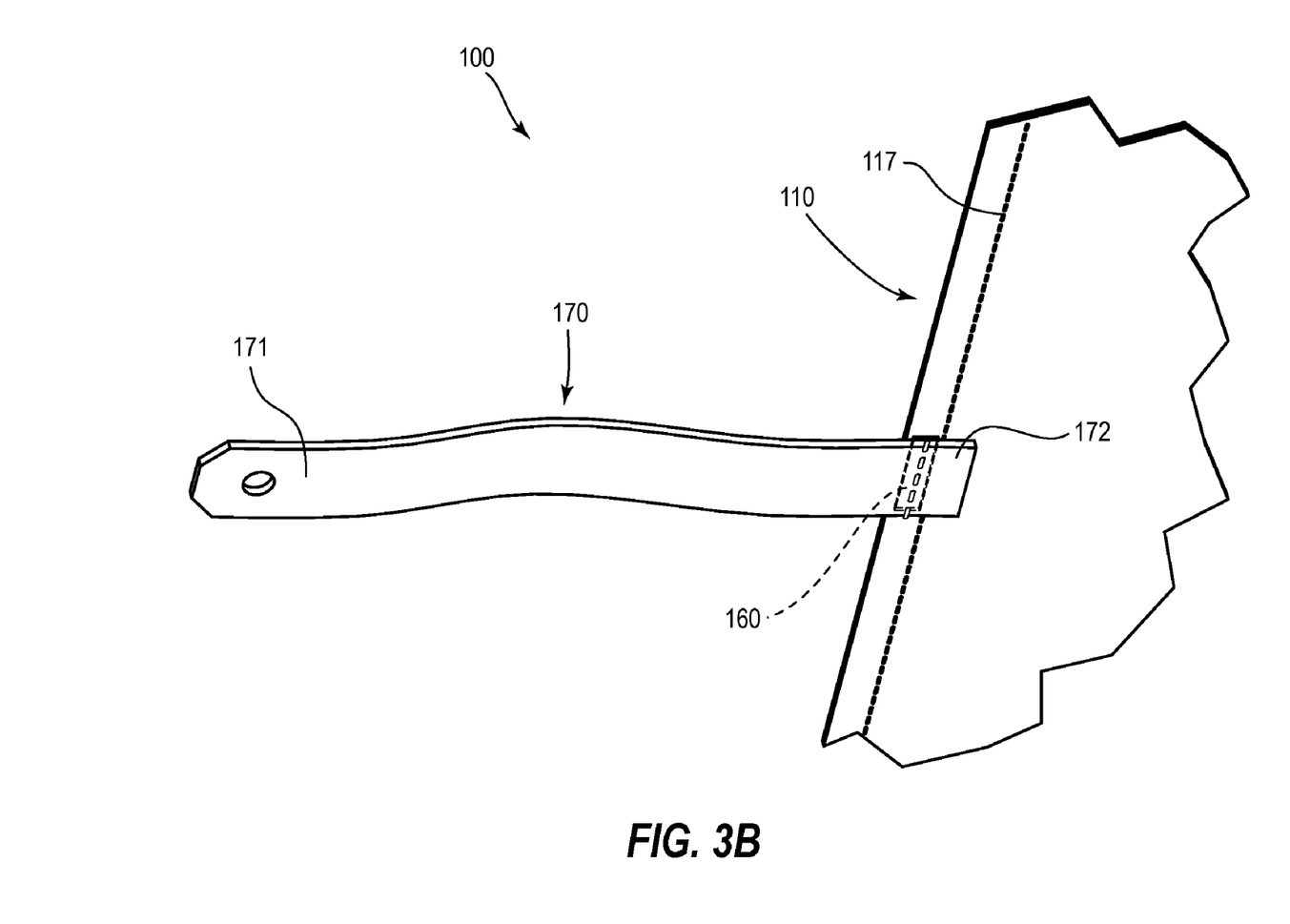
FIG. 3B is a perspective view of the portion of the airbag assembly of FIG. 3A after the external tether has been coupled to the inflatable curtain.

FIGS. 1A-1B and FIGS. 3A-3B depict another embodiment of a modular component coupled to an inflatable airbag. External tether 170 may be a modular component of inflatable airbag assembly 100. The external tether is an example of a member of a modular component. FIGS. 3A-3B depict a portion of airbag assembly 100, wherein external tether 170 is located adjacent to inflatable curtain cushion 110. Inflatable curtain airbag assembly 100 may comprise one or more external tethers. External tethers may be employed to tension inflatable curtain airbag 110 when the airbag is in a deployed configuration, as such, the airbag may be coupled to a vehicle structure, such as D-pillar 19, via tether 170. Tether 170 may comprise an elongated piece of woven nylon material that has a first portion 171 and a second portion 172. First portion 171 may be configured to receive mounting member 126. Second portion 172 may be coupled to a side of inflatable curtain airbag 110, such as first side 115, via stitching 125. Tether 170 comprises a predetermined length, such that in a deployed state, inflatable curtain airbag 110 has a predetermined tension. Tether 170 may comprise a tether assembly having a tether, and a mounting member, wherein the mounting member is configured to be coupled to the tether and the vehicle structure.

Figure 4A:
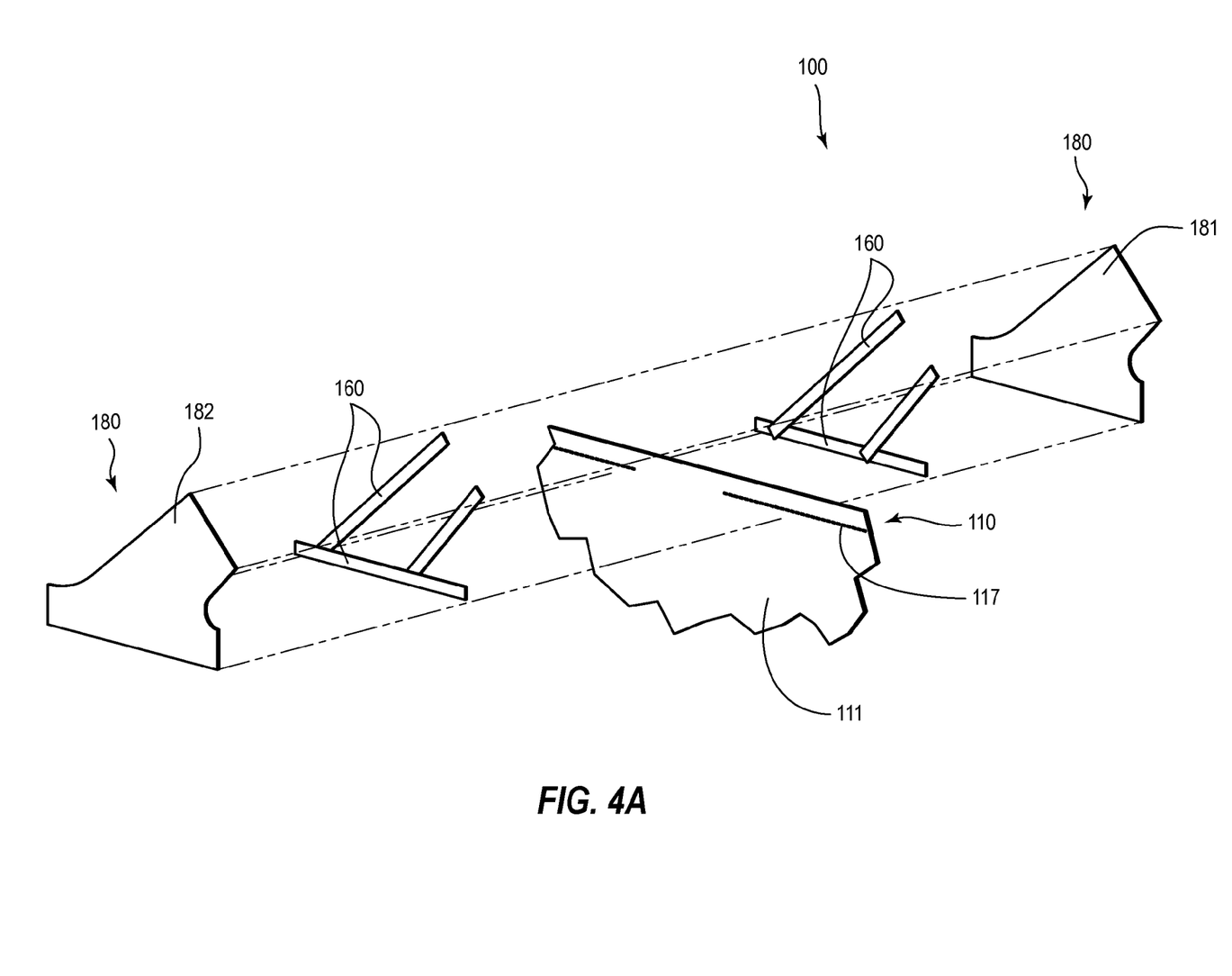
FIG. 4A is an exploded perspective view of a portion of the inflatable airbag assembly of FIG. 1A, wherein a fill tube is not yet coupled to the inflatable curtain airbag.
Figure 4B:
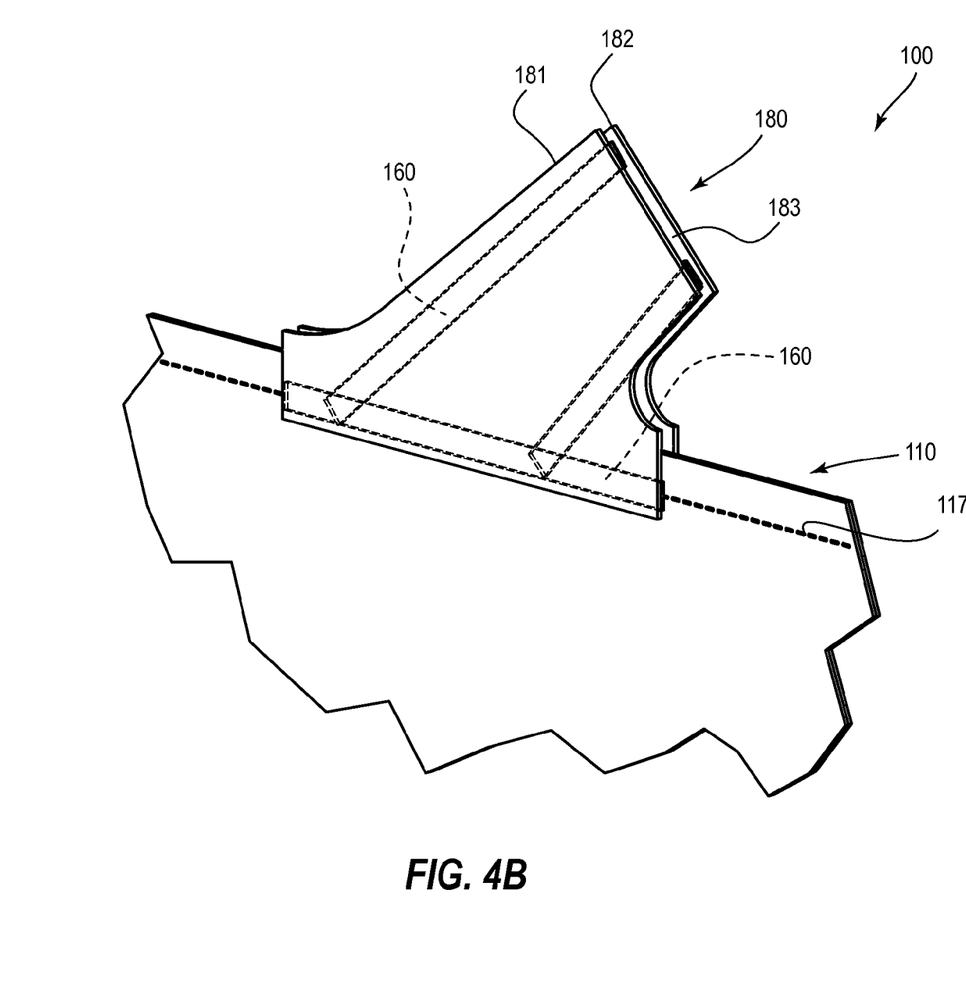
FIG. 4B is a perspective view of the portion of the inflatable airbag assembly of FIG. 4A after the fill tube has been coupled to the inflatable curtain airbag, but before the fill tube has been sewn to the airbag.
Figure 4C:
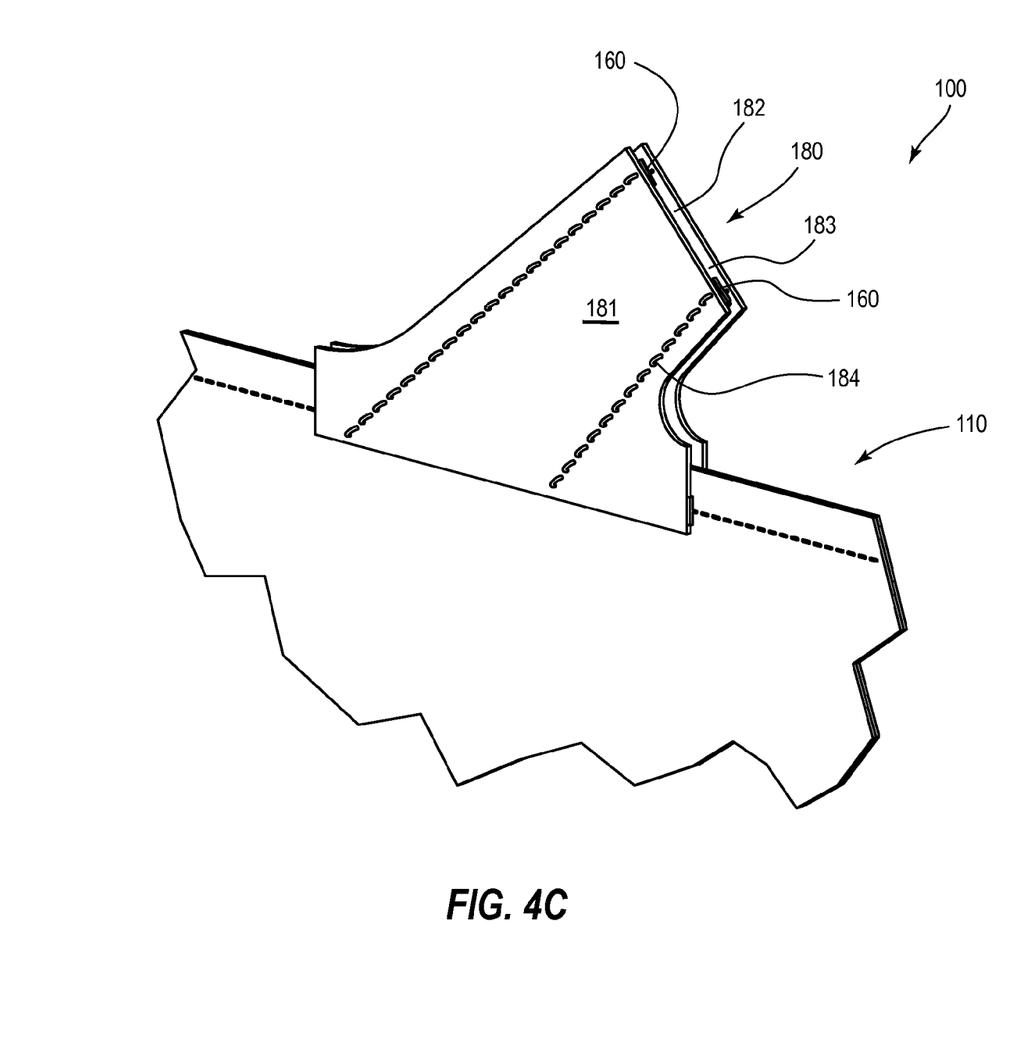
FIG. 4C is a perspective view of the portion of the inflatable airbag assembly of FIG. 4B after the fill tube has been sewn to the inflatable curtain airbag.

FIGS. 1A, 1B and FIGS. 4A-4C depict another embodiment of a modular component, fill tube 180. Fill tube 180 may be a component of inflatable airbag assembly 100. FIGS. 4A-4C are perspective views of a portion of inflatable curtain airbag assembly 100. Fill tube 180 may be located at upper portion 111 of inflatable curtain airbag 110 and may be employed to couple an inflator 190 with inflatable void 118 of the airbag. As depicted in FIGS. 1A-1B, inflator 190 may comprise an inflator tube that projects into inflatable void 118 of airbag 110 via fill tube 180. In some embodiments, a body portion of the inflator may be partially received by the fill tube, and the inflator may not comprise an inflator tube or a diffuser. In some embodiments, the inflator may be coupled to an inflator housing that acts as an inflator tube and/or diffuser.

FIG. 4A depicts an exploded perspective view of fill tube 180 and a portion of inflatable curtain airbag 110, which comprise airbag assembly 100. Inflator tube 180 may comprise a first panel 181, and a second panel 182. First and second panels 181 and 182 may be coupled together to form a fill tube prior to being coupled to airbag 110, or the panels may be coupled together at the time of their coupling to airbag 110. The first and second panels of the fill tube are examples of members of a modular component. Inflatable curtain airbag 110 may comprise a gap in perimeter seam 117, which can be formed from stitching. The gap in stitching 117 may allow an inflator or inflator tube to protrude through the gap, between the two panels of material that define the inflatable curtain airbag, and into the inflatable void of the airbag. Adhesive 160 may be employed to affix fill tube 180 to inflatable airbag curtain 110.

FIG. 4B depicts the portion of inflatable airbag assembly 100 shown in FIG. 4A after first and second panels 181 and 182 have been affixed to inflatable curtain airbag 110 via adhesive 160. In the depicted embodiment, adhesive 160 appears to be tape; however, one skilled in the art will recognize that the adhesive may comprise one or a combination of many materials, as described herein. Further, in the depicted embodiment, the adhesive forms a contiguous perimeter adjacent to a perimeter of fill tube 180, except at aperture 183, which comprises an open end. Aperture 183 is located on a top portion of fill tube 180 and is in fluid communication with the inflatable void of airbag 110.

FIG. 4C depicts the portion of inflatable airbag assembly 100 shown in FIG. 4B after first and second panels 181 and 182 have been sewn together and coupled to inflatable curtain airbag 110 via stitching 184. As described herein, adhesive 160 may be employed alone to couple modular components to an inflatable airbag; however, in some embodiments a combination of adhesive and stitching may be employed. Stitching 184 protrudes through first panel 181, second panel 182, and both layers of adhesive 160. Aperture 183 is not sewn closed such that the aperture can receive an inflator or inflator tube.

During manufacture, coupling of a modular component at a predetermined location on an inflatable airbag can be facilitated by one or more assembly aides. For example, a landmark on the modular component can be aligned with a landmark on the inflatable airbag or a landmark on another modular component. Landmarks on an inflatable airbag or a modular component may be at a predetermined location and may include edges, seams, folds, apertures, protrusions, marks, or any combination of the proceeding. The marks can be made by printing, stamping, melting, or contacting the material from which the inflatable airbag or modular component is manufactured with ink, chalk, graphite, wax, or any other suitable substance. Prior to inflatable airbag or modular component manufacture, the markings may be made on the fabric from which the airbag or modular component will be manufactured, and/or the marking may be made after manufacture of the airbag or modular component. Also, hardware such as templates or guides may be mounted to an assembly table or laid over the inflatable airbag to aid in proper location and orientation of the modular component. Additionally, a combination of landmarks and hardware may be employed to properly position and orient the modular component on the inflatable airbag.

An aperture in a modular component can be located at a predetermined position such that when the aperture is aligned with a landmark on an inflatable airbag or second modular component, the first modular component is proper aligned along at least one axis. For example, an aperture in a modular component can be aligned with a printed line on an inflatable airbag such that the line bisects the aperture. Since the aperture and the printed line are both in predetermined locations, after being fixedly coupled to the inflatable airbag, the modular component will be correctly positioned along an axis that is perpendicular to the printed line. Further, another mark can be added to the printed line, wherein the additional mark notes a target location for a modular component so that when an alignment aperture of the modular component is aligned with the marks, a "+" or "×" shape is visible within the aperture. If the landmark is located on one side or surface of the inflatable airbag or modular component, then the landmark may further define a position along the Z-axis at which the modular component is to be located. One skilled in the art will recognize that a variety of continuous and/or discrete marks can be utilized to identify target locations for modular components without departing from the spirit of the present disclosure.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
   an inflatable airbag;
   a non-inflatable modular component coupled to the inflatable airbag;
   an adhesive layer interposed between the inflatable airbag and the modular component,
   wherein the adhesive layer is double-sided tape; and
   stitching that protrudes through a portion of the modular component, the adhesive layer, and the a portion of the inflatable airbag.

2. The inflatable airbag assembly of claim 1, wherein the modular component is located adjacent to an outer edge of the inflatable airbag.

3. The inflatable airbag assembly of claim 1, wherein the modular component comprises a plurality of mounting assemblies.

4. The inflatable airbag assembly of claim 1, wherein the modular component comprises an inflator fill tube.

5. The inflatable airbag assembly of claim 1, wherein the modular component comprises an external tether.

6. An inflatable curtain airbag assembly, comprising:
   an inflatable curtain airbag comprising a first face and a second face;
   a fill tube comprising a first panel and a second panel,
      wherein the first panel and the second panel are positioned opposite from each other,
      wherein the first panel is positioned adjacent to the first face and the second panel is positioned adjacent to the second face;
   first adhesive layer interposed between the first panel and the second panel at a first perimeter of the fill tube;
   first stitching that protrudes through the first panel, the second panel, and the first adhesive layer;
   a second adhesive layer interposed between the first panel and the second panel at a second perimeter of the fill tube, wherein the first perimeter and the second perimeter of the fill tube are located at opposing sides of the fill tube:
   second stitching that protrudes through the first panel, the second panel, and the second adhesive layer; and
   a third adhesive layer interposed between one of the panels of the fill tube and an adjacent face of the inflatable curtain airbag to affix the fill tube to the inflatable airbag cushion.

7. The inflatable curtain airbag assembly of claim 6, wherein the fill tube and the inflatable curtain airbag are manufactured from silicone-coated woven nylon material.

8. The inflatable curtain airbag assembly of claim 6, wherein the inflatable curtain airbag and the fill tube comprise sealed seams.

9. The inflatable curtain airbag assembly of claim 6, wherein the adhesive layer comprises double-sided tape.

10. The inflatable curtain airbag assembly of claim 6,
    wherein the third adhesive layer is interposed between the first panel of the fill tube and the first face of the inflatable airbag cushion, and
    wherein a fourth adhesive layer is interposed between the second panel of the fill tube and the second face of the inflatable airbag cushion.

11. The inflatable curtain airbag assembly of claim 10, wherein a portion of the first stitching protrudes through both panels, the first adhesive layer, and both faces of the inflatable curtain airbag, and
    wherein a portion of the second stitching protrudes through both panels, the second adhesive layer, and both faces of the inflatable curtain airbag.

12. The inflatable curtain airbag assembly of claim 11, wherein the first stitching and the second stitching define an aperture and a gap at opposing ends of the fill tube.

13. An inflatable curtain airbag assembly comprising:
    an inflatable curtain airbag comprising a first face and a second face;
    a mounting assembly comprising:
       a mounting member having an aperture, wherein the mounting member is configured to be mounted to a vehicle structure;
       a connecting member that protrudes through the aperture in the mounting member and is coupled to the inflatable curtain airbag, wherein the connecting member comprises a first portion and a second portion; and
          wherein the first portion is coupled to the first face of the inflatable curtain airbag and the second portion is coupled to the second face of the inflatable curtain cushion;

wherein a first adhesive layer is located between the first portion and the first face and a second adhesive layer is located between the second portion and the second face; and stitching that protrudes through the first portion, the first adhesive layer, the first face, the second portion, the second adhesive layer, and the second face.

14. A method of manufacturing an inflatable airbag with modular components, the method comprising the steps of:

providing a non-inflatable modular component;

providing an inflatable airbag;

positioning the modular component on the inflatable airbag;

placing double-sided tape between a portion of the modular component and a portion of the inflatable airbag; and sewing a portion of the inflatable airbag, a portion of the modular component, and the double-sided tape together such that the the modular component is coupled to the inflatable airbag by stitching and the double-sided tape such that a portion of the stitching protrudes through a portion of the modular component, the double-sided tape, and a portion of the inflatable airbag.

* * * * *